Figure 8:
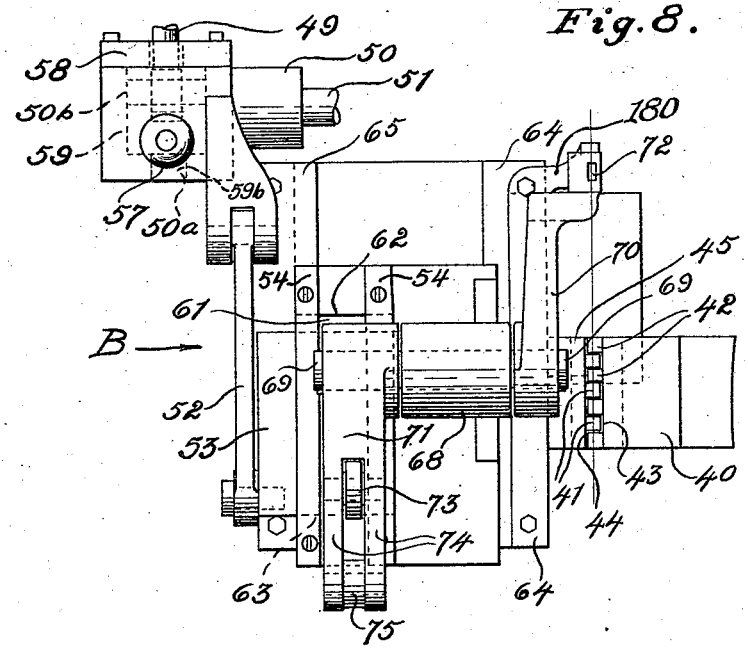

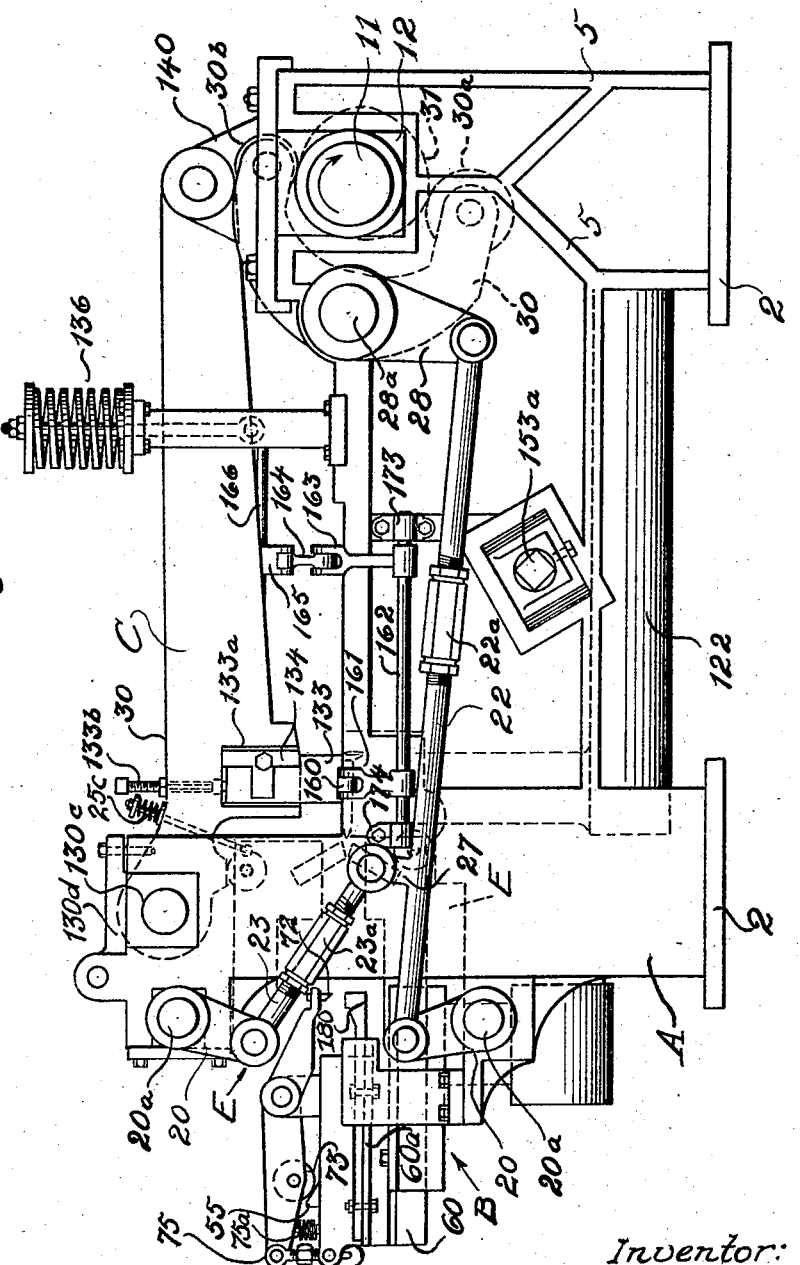

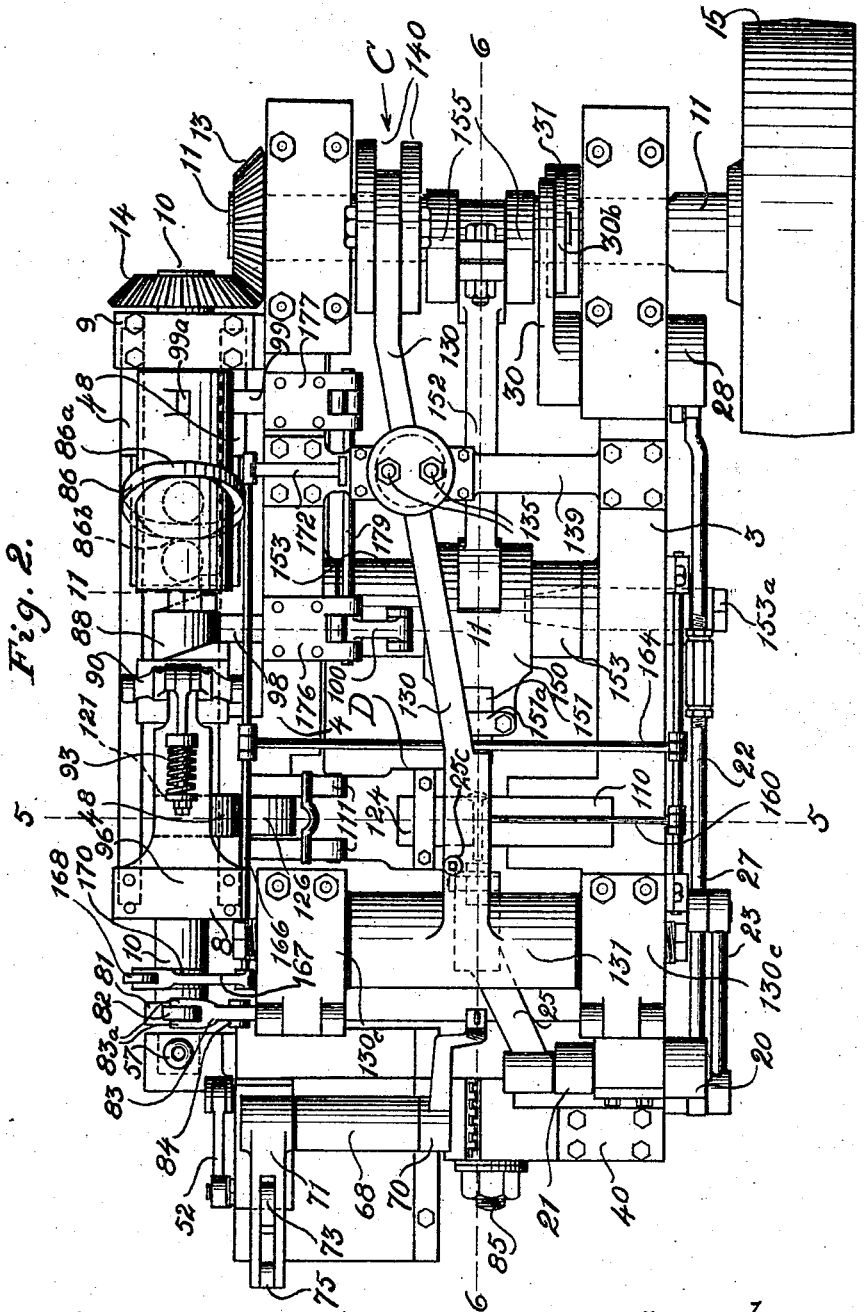

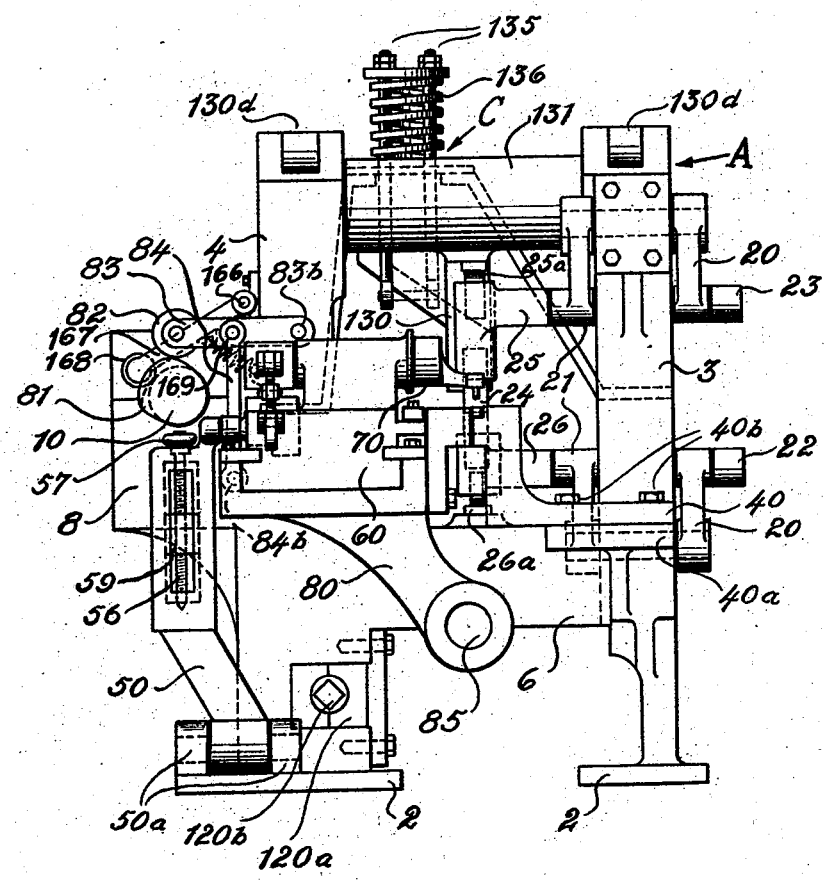

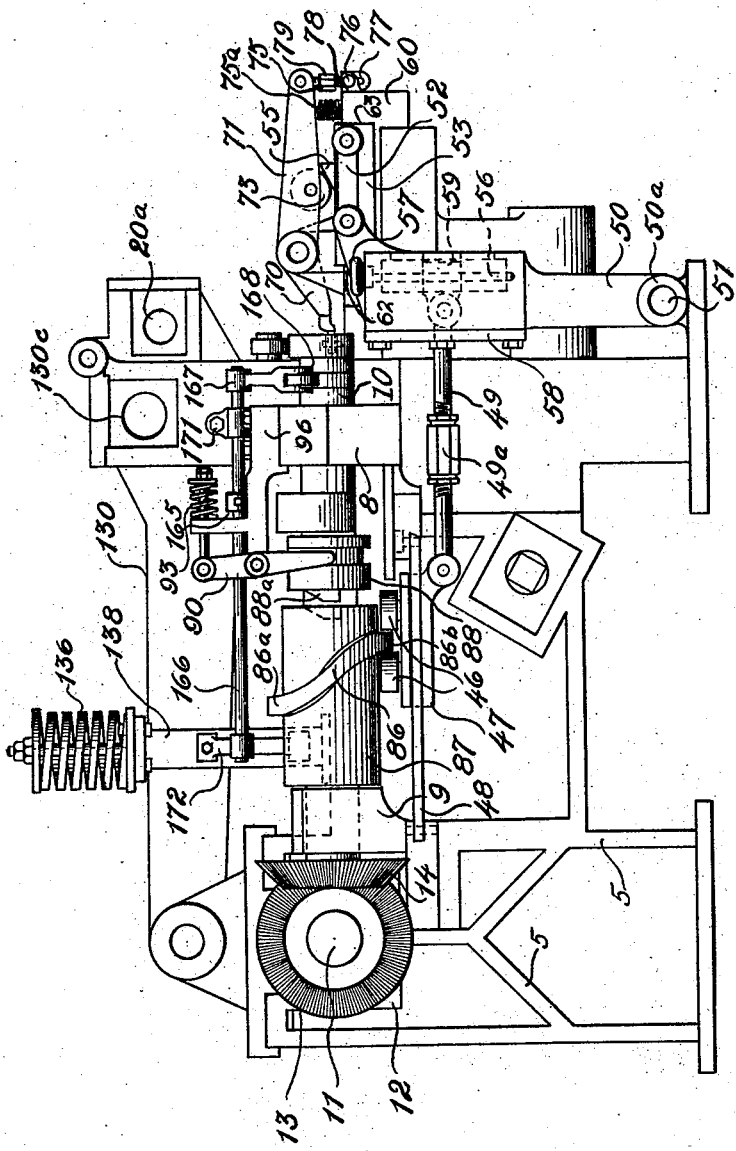

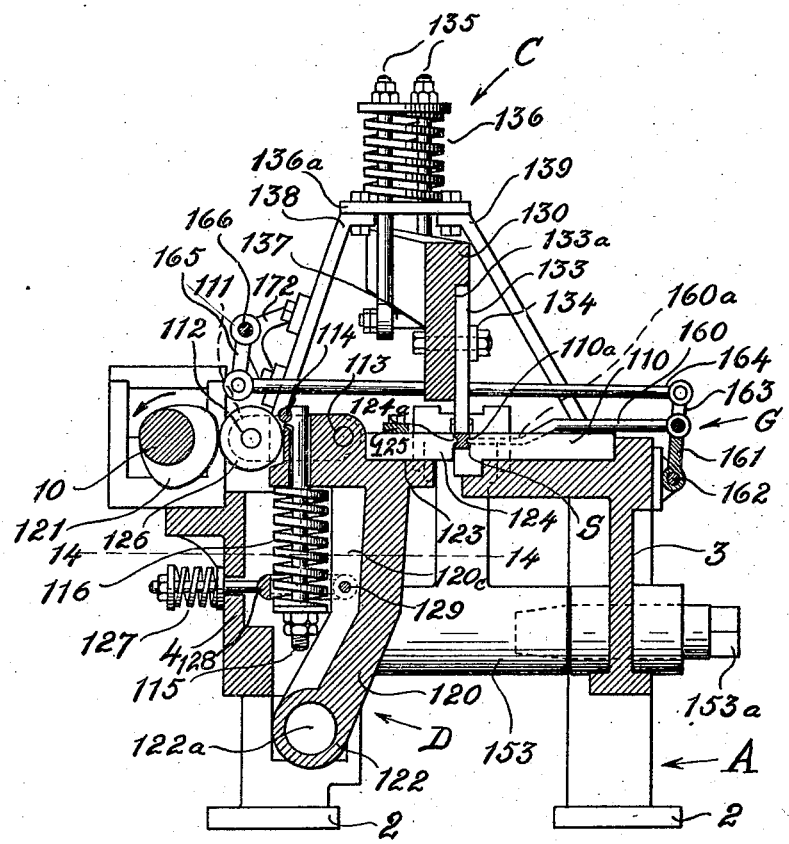

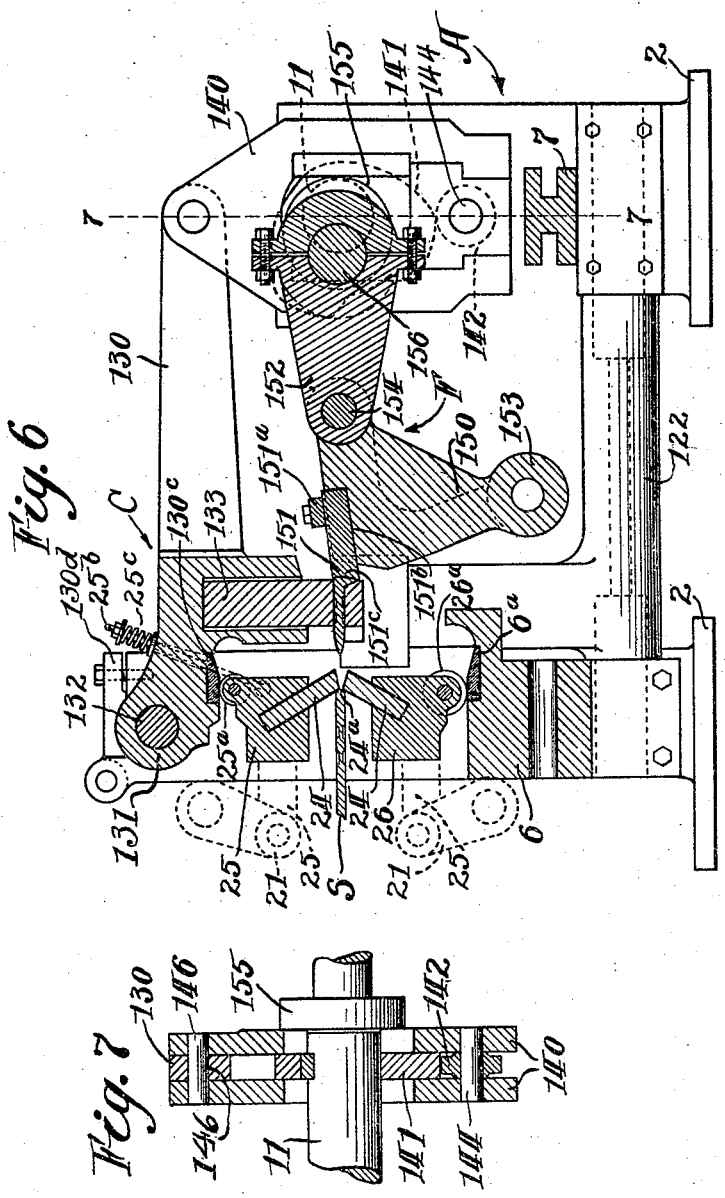

G. WEBER.
AUTOMATIC SPIKE MAKING MACHINE.
APPLICATION FILED MAR. 22, 1920.

1,418,500.

Patented June 6, 1922.
9 SHEETS—SHEET 7.

Inventor:
Gottlieb Weber
by: John E. Stryker
Attorney.

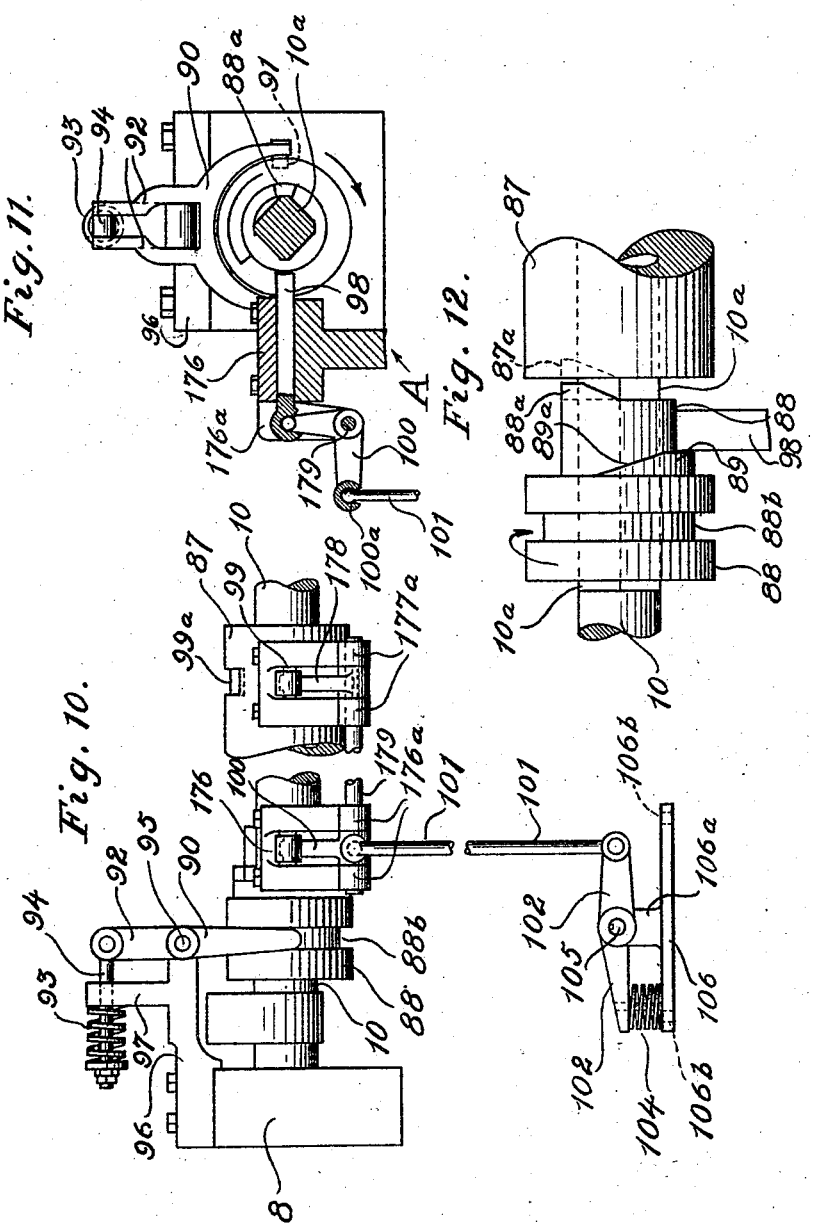

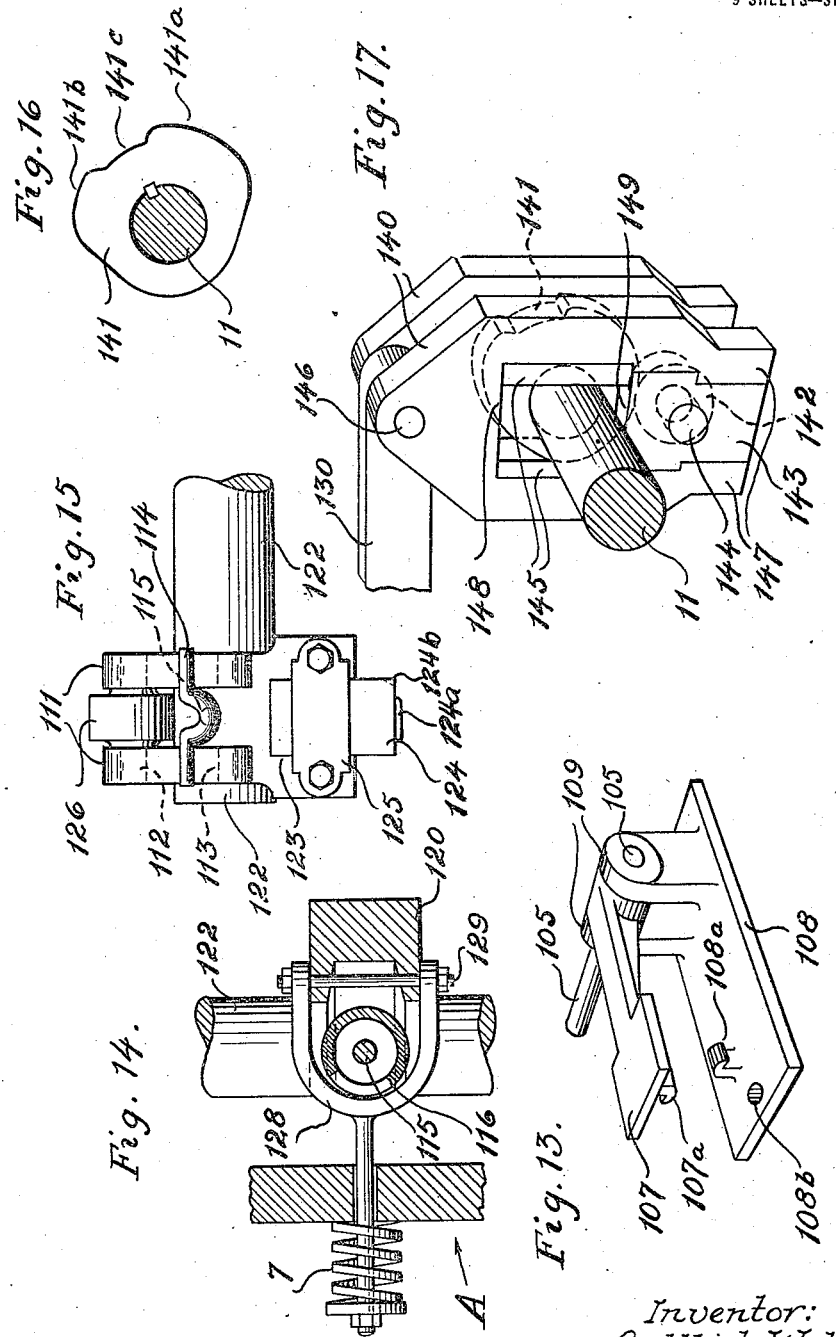

UNITED STATES PATENT OFFICE.

GOTTLIEB WEBER, OF YOUNGSTOWN, OHIO, ASSIGNOR, BY MESNE ASSIGNMENTS, TO RUSSELL-WEBER STEEL PRODUCTS COMPANY, OF YOUNGSTOWN, OHIO, A CORPORATION OF DELAWARE.

AUTOMATIC SPIKE-MAKING MACHINE.

1,418,500.  Specification of Letters Patent.  Patented June 6, 1922.

Application filed March 22, 1920. Serial No. 367,987.

*To all whom it may concern:*

Be it known that I, GOTTLIEB WEBER, a citizen of the United States, residing at Youngstown, in the county of Mahoning and State of Ohio, have invented new and useful Improvements in Automatic Spike-Making Machines, of which the following is a specification.

My invention relates to automatic spike making machines. The general object of my invention is to produce a simple and economical machine for making spikes. It is peculiarly adapted to produce railway spikes from hot bar stock formed with spaced recesses or mortices and grooves in its surface. Spike machines heretofore used are not adequate for this purpose.

An efficient machine for handling this kind of stock must eliminate variations and deformities in the product which may result from numerous causes, such as failure to engage succeeding spike lengths at a predetermined point, variable heat of the bar-stock, slipping of the same between gripping dies and irregular action of pointing and heading mechanism. Adequate gripping mechanism to start a new bar into the machine is necessary, and it is also important that the operator be able to see the working parts of the machine, and that means be provided for stopping the feeding mechanism and relieving pressure upon the working parts of the machine in case of jamming of the stock or other emergency.

A particular object of my invention is to provide a machine which shall secure the beneficial results above indicated.

By a novel co-operation between my feed mechanism and the mortices in the stock I insure uniformity in the length of stock in each spike and proper location of the mortices and grooves in each spike, so that one imperfect spike will not affect succeeding spikes, and also, by relieving the gripping pressure in the interval between the operations of pointing and heading, uniformity in the size of the heads is secured.

Another object of my invention is to provide, in a machine of this kind, feeding mechanism adapted to be stopped in a position to engage new bars at a predetermined point, thus ensuring the proper size of the first spike made from a new bar, as well as those following.

A further object is to provide automatic relief for the gripping mechanism which will act when a portion of the bar stock from which spikes are being made becomes jammed between the gripping jaws, or when for any other cause the pressure between said gripping jaws becomes excessive.

A further object is to provide, in a machine of this kind, means by which irregularities in delivery of the bar stock are prevented from causing inequalities in the heads of finished spikes.

A further object is to provide, in an automatic spike machine, means to prevent lengthening or shortening of successive spikes by the cumulative effect of variations in temperature or irregularities of delivery of bar stock.

My invention also includes various novel features of construction, which are hereinafter particularly described and pointed out in the claims.

Figure 9:
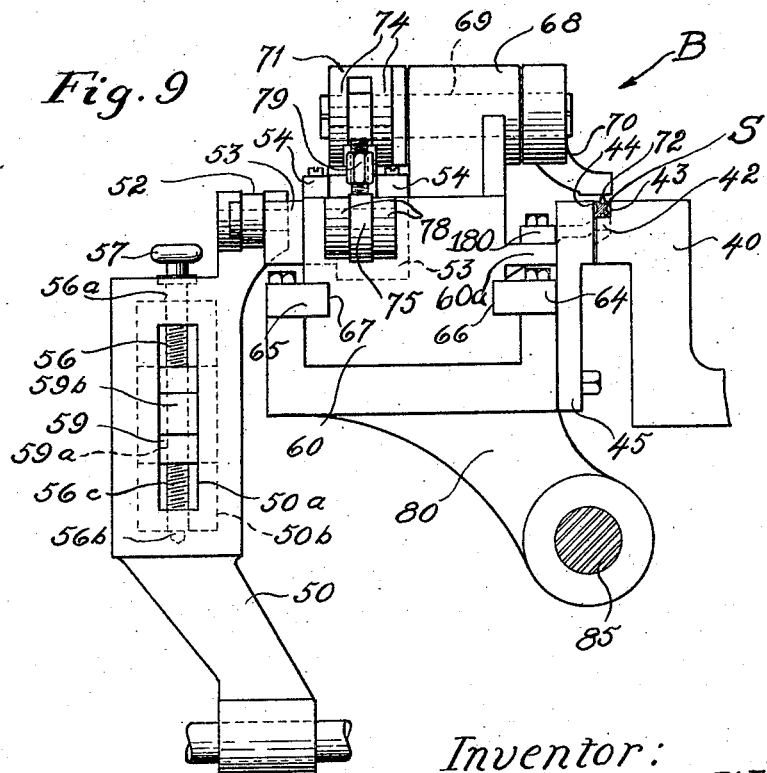

In the drawings Figure 1 is a front elevation of my improved device; Fig. 2 is a plan view thereof; Fig. 3 is an end elevation of the same; Fig. 4 is a rear elevation; Fig. 5 is a section taken on the line 5—5 of Fig. 2; Fig. 6 is a section taken on the line 6—6 of Fig. 2; Fig. 7 is a section of the top gripping lever-operating yoke taken on the line 7—7 of Fig. 6; Figs. 8 and 9 are views, in plan and elevation, respectively, of the feeding mechanism; Fig. 10 is a side elevation of the feed mechanism clutch; Fig. 11 is a staggered section of said feed mechanism clutch taken on the line 11—11 of Fig. 2; Fig. 12 is a detail plan view showing the mounting of the slidable portion of said feed mechanism clutch and a portion of the cam drum; Fig. 13 is a detail perspective view of the clutch operation pedal; Fig. 14 is a section of the side gripping mechanism together with a portion of the frame taken on the line 14—14 of Fig. 5; Fig. 15 is a plan view of a portion of the side gripping lever; Fig. 16 is a detail view of the top gripping cam and Fig. 17 is a perspective view of the top gripping lever operating mechanism.

The machine illustrated in the drawings, as an embodiment of my invention, consists generally of a frame A, feed mechanism B, a top gripping device C and a side gripping device D, adapted to alternately grip and release bar stock from which spikes are to be made, pointing devices E, a heading device F and kick-out mechanism G.

The frame A supported on flanges 2 is formed with front and rear longitudinal faces 3 and 4, respectively, said faces being provided with re-enforcing ribs 5. Transverse members 6 and 7 (Figs. 3 and 6) join the front and rear faces 3 and 4, and projections 8 and 9 (Figs. 2 and 4) form journal supports for a longitudinal shaft 10. The main power shaft 11 is mounted in bearings 12 (Fig. 1) of the frame A and is geared to the longitudinal shaft 10 through gears 13 and 14. Power is applied to the shaft 11 by a belt on the periphery of the flywheel 15, (Fig. 2) which is keyed to said shaft 11, or by any other suitable means of transmission.

Feeding mechanism.

A hot bar S, from which spikes are to be made, is received from the rolling mill on supporting teeth 41 and 42 (Figs. 8 and 9) between jaws 43 and 44 of the feed mechanism B. This feed mechanism is actuated by the cam 86 (Fig. 4) on the drum 87, said drum being revolubly mounted on the shaft 10 but so arranged that it rotates with said shaft 10 when the clutch 88 is in engagement.

The cam 86 is in the nature of a collar set at an angle with respect to the axis of the shaft 10. The cam 86 engages the rollers 46 mounted on the carriage 47, which is free to slide horizontally between the guide rods 48. Horizontal reciprocating motion of the carriage 47 is transmitted by the rod 49 to the large lever 50 (Figs. 4, 8 and 9) which is pivoted on the pin 51 in the bearing 50ᵃ in the base of the frame A. The upper end of the lever 50 is joined by the link 52 to the block 53. Said block 53 fits in the slot 61 in the main feed slide 60 and is held down by the bars 54, screwed to said feed slide 60. The slot 61 is longer than the block 53 and allows said block 53 to slide horizontally a short distance before it engages the end surface 62 or 63 of said slot 61. When engagement occurs with either of the end surfaces 62 or 63 of the slot 61, further motion of the block 53 in that direction is transmitted to the feed slide 60. A lug 55 (Fig. 4) is fastened by suitable means to the top surface of the block 53.

The feed slide 60 is mounted in the support 80 which is pivoted on the large pin 85, said pin being fastened in suitable manner in frame A. Guides 64 and 65, extending into slots 66 and 67 in the feed slide 60 are bolted to the support 80 and allow said feed slide 60 to move longitudinally on said support 80. Cast integral with the feed slide 60 is a bearing 68 in which the shaft 69 is free to rotate. The ends of the shaft 69 project from the bearing 68 and have the arms 70 and 71 keyed thereto. The finger 72 projects downward from the end of the arm 70, and is adapted to fit into mortices in the top surface of the bar stock S (Fig. 9) from which spikes are to be made. For the sake of clearness the scale to which the bar stock S is shown in the drawings has been made approximately twice that of the machine. An arm 180 (Figs. 1, 8 and 9) is provided to support the bar stock S directly beneath the finger 72. The arm 180 is bolted in suitable manner to a projection 60ᵃ (Fig. 9) on the feed slide 60.

The arm 71 has bifurcated ends 74 between which are mounted the roller 73 and the link 75. The link 75 is pivoted at its upper end in the arm 71 and joined, by means of the pin 76 (Fig. 4) passing through a slot 77 in its lower end, to the projections 78 on the feed slide 60. The link 75 is made adjustable by means of a turnbuckle 79 and is provided to limit motion imparted to the arm 71 by the lug 55 on the block 53. The roller 73 is adapted to rest upon the sloping top surface of the lug 55 in such a manner that longitudinal motion of said lug 55 will cause motion in an upward or downward direction of the arm 71. Supposing the feed mechanism B to be in its extreme right hand position, shown in Fig. 4, motion to the left would at first cause the lug 55 to move under the roller 73 thereby raising the arm 71 and lowering the finger 72, into a mortice in the bar stock S. Further motion of the block 53 will bring it into contact with the end 62 of the slot 61 in the feed slide 60 and carry said feed slide 60 along with the bar stock S to the left, thereby feeding the bar stock S into the machine. When motion to the left ceases and the block 53 starts to the right it will again move the lug 55 under the roller 73 but this movement will allow the arm 71 to fall (by reason of the action of gravity) and raise the finger 72 on the arm 70 out of engagement with the mortices in the bar stock S. A tension spring 75ᵃ is provided to accentuate the action of gravity in raising the finger 72 out of engagement with mortices in bar stock S. Further motion to the right brings the block 53 in contact with the end 63 of the slot 61 and moves the feed slide 60 back to the starting position.

The length of the spike to be made is dependent on the length of stroke of the feed slide 60, and, as it is desirable to have a machine that will make spikes of various lengths, I provide an adjustment whereby the connection between the rod 49 and the lever 50 may be moved upward or downward to produce a shorter or longer spike as desired. The rod 49 is pivotally connected, through a slot in the plate 58 (identical with slot 50$^a$, Fig. 9), to the block 59. The lever 50 is formed with a rectangular shaped hollow interior 50$^b$ (Figs. 8 and 9), the vertical surfaces of which form guides for the movement of the block 59. The screw 56 is keyed to the knob 57 and is revoluble in bearings 56$^a$ and 56$^b$ (Fig. 9) in the hollow interior of the lever 50. The threaded portion 56$^c$ of the screw 56 passes through the tapped hole 59$^a$ in the block 59 in such manner as to cause said block 59 to be moved upward or downward when the knob 57 is turned. The block 59 is held in the lever 50 by the plate 58, said plate being bolted in suitable manner to the face of the lever 50. The block 59 is formed with a projecting lug 59$^b$ (Figs. 8 and 9) which bears against the vertical surfaces of the slot 50$^a$ and forms with said slot 50$^a$ another guide for vertical motion of the block 59.

In order to permit the bar stock S to pass the projection 110$^a$ (Fig. 5) of the stationary die 110, without being bent, and also to straighten said bar stock S, it is supported when it is received from the rolling mill, or interlocking teeth 41 and 42, formed respectively on the straightening jaws 45 and 40, and alternately gripped and released between the surfaces 43 and 44 of said straightening jaws. The stationary straightening jaw 40 is bolted in a suitable manner by bolts 40$^b$ (Fig. 3) to the projection 40$^a$ of the frame A. The movable straightening jaw 45 is bolted to the feed support 80, as shown in Fig. 9, and a gripping motion is produced by tilting the feed support 80. The feed support 80 is tiltably mounted on a large bolt 85, said bolt being held in a suitable manner in the frame A, and tilting motion is imparted to the feed support 80 by a cam 81 on the end of the shaft 10 (Fig. 3), through a roller 82, a lever arm 83 and a link 84. The roller 82 is mounted between the bifurcated ends 83$^a$ (Fig. 2) of the lever arm 83 and is held in contact with the periphery of the cam 81 by the mass of the feed support 80 and the feed mechanism 60 under the action of gravity. One end of the lever arm 83 is pivoted on a pin 83$^b$ in the frame A; the other end is supported and actuated by the roller 82 on the cam 81, and the upper end of the link 84 is pivotally connected to said lever arm 83 near its middle point. The lower end of the link 84 is also pivotally connected by a pin 84$^b$ to the inner end of the feed support 80. Thus tilting motion is given to the feed support 80 but this motion is not sufficient to draw the teeth 41 of the movable straightening jaw 45 entirely out of mesh with the teeth 42 on the stationary straightening jaw 40. Therefore, said teeth 41 and 42 always present a support for the bar stock S. Clearance is allowed between adjacent teeth to permit the passage of scale that may be scraped from the bar stock S. Tilting motion is so timed by adjustment of the cam 81 that release of the bar stock S occurs during the inward or feeding stroke of the feed slide 60.

The cam 86 for actuating the feed mechanism (Figs. 2 and 4) has segments 86$^a$ and 86$^b$ which extend in a direction perpendicular to the axis of the drum 87 for a distance of about one eighth the circumference of said drum 87. The purpose of these segments 86$^a$ and 86$^b$ is to cause the feed slide 60 to stop for an instant at both ends of its travel. This is desirable in order to allow the finger 72 time to properly engage and disengage itself from the mortices in the bar stock S, and to allow for variations in the time of gripping caused by the wear in the gripping and feeding mechanism.

Clutch mechanism to allow the feed slide 60 to be stopped at the will of the operator, without stopping the whole machine, is shown in detail in Figs. 10, 11, 12 and 13. As has been stated, the drum 87 is revolubly mounted on the shaft 10 and the clutch 88 (Fig. 12) is mounted on a squared portion of said shaft 10, and is slidable longitudinally. A lug 88$^a$, formed on the end surface of the clutch 88, is adapted to be engaged in a similarly shaped recess 87$^a$ in the drum 87 in such manner as to cause said drum 87 to rotate with the clutch 88 when said lug 88$^a$ is in engagement with said recess 87$^a$. A yoke 90 straddles the clutch 88 and has studs 91 at the lower ends of its arms which extend into an annular groove 88$^b$ in the clutch 88. The upper portion of the yoke 90 consists of two arms 92 between which the ends of a spring rod 94 and a yoke support 96 are held. A pin 95 passes through the arms 92 and the yoke support 96 to form a pivot for the yoke 90. The spring rod 94 is pivotally joined to the upper ends of arms 92, passes through a vertical projection 97 of the yoke support 96 and has a compression spring 93 mounted upon it. The yoke support 96 is bolted to and forms a cap for the bearing 8 of the shaft 10 (Figs. 2, 4, 10 and 11). The spring 93, actuating the rod 94 and the yoke 90, tends to hold the lug 88$^a$ on the clutch 88 in engagement with the recess 87$^a$ in the drum 87. A cam 89 is formed integral with the clutch 88. In operation, when it is desired to stop the feed mechanism, a key 98 is inserted to the position shown in Figs. 2, 11 and 12. When the key 98 is inserted it will first strike the sloping surface 89$^a$ (Fig. 12) of the cam 89, and rotation being in the direction indicated by the arrows, (Figs. 11 and 12) as the clutch 88 continues to rotate the key 98 will run up the surface 89$^a$ and force the lug 88$^a$ out of engagement with the recess 87$^a$ against the action of the spring 93. At this instant a key 99 (Figs. 2 and 10) penetrates a recess 99$^a$ in the drum 87 and stops said drum together with the feed mechanism. As rotation of the clutch 88 continues the cam 89 will pass the key 98 but by this time the lug 88$^a$ will have passed the recess 87$^a$ and the action of the spring 93 will merely cause the lug 88$^a$ to bear against the end surface of the drum 87 until the cam 89 again engages the key 98 and prevents the lug 88$^a$ from entering the recess 87$^a$. There being but one recess for the lug 88$^a$ and one for the key 99 makes it impossible for the machine, once properly timed, to be thrown out of timing by the use of the clutch. The cam 89, the lug 88$^a$ and the recess 99$^a$ are so spaced with respect to keys 98 and 99 that the feed slide 60 will be stopped at the end of its outward stroke. Said keys 98 and 99 are similar to each other and are slidably held under plates 176 and 177, which are bolted to the top surface of the frame A and severally formed with arms 176$^a$ and 177$^a$ extending downward, as shown in Fig. 2. The inner ends of the keys 98 and 99 (Figs. 10 and 11) are formed with recesses to receive the upper ends of the L shaped crank 100 and bell crank 178, respectively, both cranks being splined on the shaft 179. This shaft 179 has bearings in the lower ends of arms 176$^a$ and 177$^a$. The crank 100 is connected with the lever 102 by a vertical rod 101 which is formed with a ball joint 100$^a$ in the crank 100 and is pivotally connected at its lower end to a lever 102.

The clutch actuating device illustrated in Fig. 13 is located at any point convenient for the operator. A pedal 107 is mounted between bearings 109 formed on a plate 108 and is keyed to a shaft 105. Said shaft 105 is revoluble in bearings 109 and 106$^a$ (Fig. 10) on plates 108 and 106, respectively. The lever 102 is keyed to the shaft 105 near the bearing 106$^a$ and is adapted when the foot pedal 107 is depressed to move the rod 101 upward. A spring 104 returns the pedal 107 and parts operated thereby to original positions. A catch 107$^a$ is provided on the pedal 107 which may be made to engage a catch 108$^a$ on the base plate 108 when it is desired to leave the feed mechanism out of operation for an extended period of time. There is sufficient lateral play between the pedal 107 and bearings 109 to allow the catches 107$^a$ and 108$^a$ to pass each other. The ball joint 100$^a$ permits base plates 106 and 108, connected by the shaft 105, to be placed at any desired angle on the floor. Said base plates 106 and 108 are perforated at 106$^b$ and 108$^b$ to receive floor bolts. Thus, when the operator desires to stop the feed mechanism he depresses the pedal 107; this compresses the spring 104, raises the rod 101 and causes the keys 98 and 99 to stop the rotation of the drum 87.

*Pointing and serving mechanism.*

The operation of pointing the spikes is performed by dies 24 (Fig. 6). Said dies are rigidly fixed in pointing levers 25 and 26. Rollers 25$^a$ and 26$^a$ are revolubly mounted at the inwardly extending ends of said levers 25 and 26, respectively, and the outer ends of said pointing levers are pivotally connected to the smaller ends of the inner bell cranks 21, shown in Figs. 2 and 3. Said inner bell cranks 21 are similar to and located in parallel relation with outer bell cranks 20. Shafts 20$^a$ (Fig. 1) are revolubly mounted in suitable bearings in frame A and the bell cranks 20 are keyed to the outward and inward projecting ends thereof. The outer bell cranks 20 are pivotally joined to the ends of rods 22 and 23, said rod 23 being joined at its opposite end to a projection 27 on the rod 22. The rods 22 and 23 are made adjustable as to length by means of turnbuckles 22$^a$ and 23$^a$, respectively. The right hand end (Figs. 1 and 2) of the connecting rod 22 is pivotally connected to the lower end of the bell crank 28, the upper end of which is keyed to the shaft 28$^a$. Said shaft 28$^a$ is revolubly mounted in the frame A and has a cam yoke 30 keyed to its inner end. Rollers 30$^a$ and 30$^b$ are mounted at the extremities of the upper and lower arms of said cam yoke 30. The pointing cam 31 is keyed to the shaft 11 and is so placed and constructed that the rollers 30$^a$ and 30$^b$ remain in contact with the periphery thereof when the shaft 11 revolves. Thus when said shaft 11 revolves said cam yoke 30 is tilted in an arc with the shaft 28$^a$ as a center.

Through the linkage just described pointing levers 25 and 26 are given a substantially horizontal reciprocating motion when in operation. The roller 26$^a$ supports the inner end of the lever 26 on the top surface of a stationary cam 6$^a$ mounted in the transverse member 6 of the frame A. Said cam 6$^a$ is formed with a sloping surface, down which the roller 26$^a$ rolls when the lever 26 is moved to the right from the position shown in Fig. 6. The pointing lever 25 is supported at its inner end by a rod 25$^b$, which is pivotally fastened at its lower end to the lever 25, passes through a slot in the top gripping lever 130 and is provided with a compression spring 25$^c$ at its upper end. Said compression spring 25$^c$ keeps the roller 25$^a$ in contact with the lower surface of a cam 130$^c$ on the top gripping lever 130 when the lever 25 is given reciprocating motion.

The cam 130ᶜ is rigidly mounted on the under side of the top gripping lever 130 and is formed with a sloping surface similar to that of the cam 6ᵃ, which allows the inner end of the lever 25 to rise when moved towards the right from position shown in Fig. 6. Cutting edges 24ᵃ of the dies 24 are thus separated a distance sufficient to allow the bar stock S to pass between them when the levers 25 and 26 are in the extreme right hand position, but said cutting edges are brought together as levers 25 and 26 are moved towards the left from this position. The positions of the inner bell cranks 21 and outer portions of the pointing levers 25 and 26, with respect to the portions shown in section, are illustrated in dotted lines in Fig. 6.

*Heading mechanism.*

The heading device F (Fig. 6) consists of a heading lever 150, die 151, pitman 152 and eccentric crank 155 on the shaft 11. The heading lever 150 is tiltably mounted between the front and rear faces 3 and 4 of the frame A (Fig. 2) by means of large screws 153ᵃ which pass through the frame A and project into the hubs 153 of said heading lever 150. The die 151 is held in the recess 151ᵇ of the heading lever 150 by the clamp 151ᵃ. The projecting end of the die 151 is formed with a spoon shaped depression or die face adapted to form the heads of spikes. A wrist pin 154 pivotally connects the heading lever 150 with one end of the pitman 152; the outer end of said pitman is formed with a bearing of ordinary type having two halves, through which the eccentric crank pin 156 passes. Thus when the shaft 11 revolves the heading lever 150 is given a reciprocating tilting motion with the center line of the screws 153ᵃ as an axis.

*Top gripping mechanism.*

Top gripping device C (Figs. 2, 5, 6, 7, 16 and 17) consists of a top gripping lever 130, a top gripping steel 133 (Figs. 5 and 6), a compression spring 136, a yoke 140 (Figs. 17 and 7) and a top gripping cam 141 (Figs. 16 and 17). The top gripping lever 130 is formed with a hub 131 (Figs. 2 and 3) and is tiltably mounted between the front and rear faces 3 and 4 of the frame A, in bearings 130ᶜ (Fig. 1). Said bearings 130ᶜ are provided with hinge caps 130ᵈ of ordinary design. The top gripping lever 130 is provided at its opposite end with a bearing 146ᵃ (Fig. 7) between the yokes 140 through which the pin 146 (Figs. 17 and 7) passes.
The yokes 140 are similar to each other, are spaced in parallel relation and formed with arms 147, which straddle the shaft 11. The ends of the pin 146 are suitably held in the yokes 140 so that the end of the gripping lever 130 is journaled to tilt upon said pin between said yokes. A roller 142 is mounted in the space between said yokes, on a pin 144, the ends of said pin being suitably held in blocks 143. The blocks 143 close the lower ends of the space between the arms 147 of the yokes 140. Parallel wearing strips 145 are provided to bear against the periphery of the shaft 11 and allow the yokes 140 to slide upward to a point where surfaces 149 of the block 143 comes in contact with the lower side of the shaft 11 and downward to a point where surfaces 148 of the yokes 140 comes in contact with the upper surface of the shaft 11.
The cam 141 is keyed to the shaft 11 and is adapted to rotate between the two yokes 140. The compression spring 136 (Figs. 1 and 5) is supplied to support the right hand end (Fig. 1) of the top gripping lever 130 and holds the roller 142 in contact with the periphery of the cam 141. Thus when the cam 141 rotates, the right hand end of the top gripping lever 130 is moved in a substantially upward and downward direction a distance equal to the throw of the cam 141. Said cam 141 (Fig. 16) is formed with high segments 141ᵃ and 141ᵇ separated by a slightly lower segment 141ᶜ. The action of the spring 136 is transmitted to the gripping lever 130 through rods 135 (which straddle said gripping lever) and the bolt 137 which passes through the lower ends of the rods 135 and under the lever 130. Brackets 138 and 139 (Fig. 5) support the spring 136 and are bolted in a suitable manner to the frame A and to a spring supporting plate 136ᵃ. The top gripping steel 133 is held in a recess 133ᵃ (Figs. 1 and 5) of the top gripping lever 130 by a T shaped clamp 134, and projects downward to grip the top surfaces of spikes. The top gripping steel 133 is given vertical adjustment by means of a screw 133ᵇ.

*Side gripping mechanism.*

The side gripping device D is actuated by a cam 121 on the shaft 10 (Fig. 5) and tilts about an axis 122ᵃ of a long hub 122 formed on the side gripping lever 120 (Figs. 5 and 6). Said hub 122 extends between bearings 120ᵃ in the frame A. Screws 120ᵇ (Fig. 3) pass through the frame A and project into the hub 122 forming pivots about which the lever 120 tilts. A die 124 (Figs. 5 and 15) is held in a recess 123 of the lever 120 by a clamp 125. The face of the die 124 is formed with a welt 124ᵃ adapted to fit into corresponding depressions in the side of the bar stock S and a corner 124ᵇ of said die is shaped to form the lower surface of one side of the heads of spikes. The stationary die 110 (Figs. 2 and 5) forms the other side gripping jaw and also a support for the under side of the bar stock. Said stationary die 110 is also provided with a welt 110ᵃ, similar to the welt 124ᵃ, and its edge opposite the corner 124ᵇ is shaped to mould the under side of the heads of spikes.

A roller 126 is revolubly mounted on a pin 112 between relief arms 111, which are pivotally held in recesses in the side gripping lever 120 by a pin 113. The bottoms of the recesses in the lever 120 form stops for movement of the relief arms 111. A bar 114, (Fig. 15) made integral with a vertical rod 115, is recessed into the top surface of the relief arms 111 between the roller pin 112 and the hinge pin 113. The vertical spring rod 115 passes through a drilled hole in the side gripping lever 120 and has the heavy compression spring 116 (Fig. 5) mounted on its lower end. This spring 116 tends to prevent the roller ends of relief arms 111 from rising out of the horizontal position in the recesses in the lever 120. A spring 127 together with a fork 128 and a bolt 129 (Fig. 14) are provided to hold the roller 126 in contact with the periphery of the cam 121. The fork 128 passes through the frame A and straddles the relief spring 116 while the bolt 129 passes through the ribs 120ᶜ of the lever 120 to form a pivot for the inner ends of the fork 128.

The operation of the side gripping mechanism is as follows: The cam 121 revolving on the shaft 10, rocks the side gripping device D about the axis 122ᵃ of the hub 122, thereby alternately gripping and releasing the bar stock S. The compression of the relief spring 116 is so adjusted that normal pressure between the gripping jaws will not cause the spring 116 to be compressed, but (the rotation of the shaft 10 being in the direction indicated by an arrow in Fig. 5) in case of jamming when the gripping pressure becomes excessive, the roller 126 together with the ends of the relief arms 111, the cross bar 114 and the vertical rod 115 will rise, compressing the spring 116 an amount sufficient to allow the cam 121 to pass without closing the gripping jaws.

Kick-out mechanism.

The kick out mechanism G is provided to push finished spikes off the stationary die 110 (Fig. 5) at the moment when the top gripping steel 113 is raised and the side gripping die 124 has moved away to the left. A kick out rod 160 (Figs. 2 and 5) has a portion 160ᵃ (Fig. 5) which is bent down and slides in a groove in the stationary die 110. A bell crank 161, a front kick out shaft 162, a bell crank 163, a cross rod 164, a bell crank 165, a rear kick out shaft 166 and a roller arm 167 (Figs. 2, 3, 4 and 5) form a system of linkage between the kick out rod 160 and a kick out cam 170. A roller 168 is mounted between the bifurcated ends of the roller arm 167 and is held in contact with the periphery of the kick out cam 170 by the tension spring 169 (Fig. 3). Said kick out cam 170 is formed integral with the shaft 10. The roller arm 167 is keyed at its upper end to the rear kick out shaft 166, and said shaft is revolubly mounted in a bearing 171 (Figs. 4 and 5) bolted to the frame A and a bracket bearing 172 bolted to the bracket 138. The bell crank 165 (Fig. 5) is keyed at its upper end to the shaft 166 and is pivotally connected at its lower end to the cross rod 164. The bell crank 163 is keyed to the front kick-out shaft 162 and is actuated by the cross rod 164. The front kick out shaft 162 is revoluble in bearings in plates 173 and 174 (Fig. 1) bolted to the frame A, and has bell cranks 161 and 162 keyed to it between said plates 173 and 174. The kick out rod 160 is pivotally mounted between the bifurcated ends of the bell crank 161.

Operation.

The timing of my machine is such that the sequence of operations is as follows. With the feed mechanism clutch 88 out of engagement, a hot bar is placed on the supporting teeth 41 and 42 with the first mortice of the bar directly under the finger 72. At this time the feed carriage 60 is at the end of its outward stroke and the straightening jaws 43 and 44 are open. When the clutch pedal 107 is released the feed mechanism is started; the finger 72 is inserted in the first mortice in the bar stock S and feeds said bar stock into the machine. The top gripping die 133, side gripping die 124 and straightening jaw 43 now grip the bar stock S and the pointing dies 24 cut off a portion of said stock to form a spike and at the same time draw out the point of the pike. In doing this the dies 24 force the remaining stock back a short distance against the pressure of the straightening jaw 43, thus straightening said remaining stock. During the process of pointing, the high portion 141ᵃ of the top gripping cam 141 is in contact with the roller 142, producing the gripping pressure. By the time pointing is completed the depression 141ᶜ is in contact with the roller 142 and the pointed blank is partially released. At this instant the heading die 151 is approaching the head end of the pointed blank and, if said blank has been over delivered by the feed mechanism, the heading die 151 will force it back until the second high portion 141ᵈ on the cam 141 causes the stock to be gripped firmly. Further motion of the heading lever 150 in this direction upsets the end of the stock, forming the head of the spike. By turning the knob 57, over delivery, which in my machine I consider desirable, may be secured. In this way uniformity in the heads of spikes is assured. The spike is now complete and the top gripping lever 130 rises, the side gripping lever 120 moves away and the kick out rod 160 throws the spike off the end of the stationary die 110.

Finished spikes fall from the end of the stationary die 110 into any suitable receptacle placed on the floor or are carried away by a mechanical conveyor of suitable design.

Having described my invention what I claim as new and desire to protect by Letters Patent is:

1. A spike machine comprising a supporting frame, stock gripping, pointing, heading and ejecting mechanism and means for actuating said mechanism supported in said frame, a reciprocating feed carriage, a laterally oscillating support for said carriage and straightening jaws mounted between said carriage support and said frame, whereby the bar stock will be guided into the machine and straightened.

2. A spike machine comprising a supporting frame, stock gripping, pointing, heading and ejecting mechanism and means for actuating said mechanism supported in said frame, a reciprocating feed carriage, having a recess within and an arm tiltably mounted on said feed carriage adapted to engage the material to be operated upon, a roller on said arm, a block held in said recess, said recess being larger than said block to permit limited motion of said block in said recess, and a lug on said block adapted to engage said roller and impart tilting motion to said arm when said block is moved.

3. In a spike machine the combination of a frame, a cam shaft journaled in said frame, a cam mounted on said shaft, feeding mechanism comprising a feed carriage and a laterally movable support for said carriage mounted in said frame, and linkage whereby said cam will impart lateral motion to said support.

4. A spike machine comprising a supporting frame, power shafts journaled in said frame, a plurality of cams mounted upon said shafts, feeding, pointing and ejecting mechanism suitably supported in said frame and actuated by certain of said cams and a clutch adapted to arrest the rotation of one of said cams and thereby stop said feeding mechanism.

5. In a spike machine, the combination of a frame, a power shaft journaled in said frame, of stock feeding mechanism comprising a feed carriage, a support for said carriage, means for reciprocating said feed carriage and causing said carriage to pause at the ends of its stroke, comprising a cam mounted upon said power shaft and set for the most part at an acute angle with the axis of said shaft but having segments extending at a right angle to the axis of said shaft, and linkage between said cam and said feed carriage.

6. In a spike machine, the combination of a frame, a power shaft journaled in said frame, feeding mechanism supported in said frame, a drum revolubly mounted on one of said power shafts, a cam on said drum, linkage between said cam and said feeding mechanism whereby motion is transmitted to said feeding mechanism from said cam, a clutch, slidable longitudinally on said last mentioned shaft, adapted to engage said drum, and means for disengaging said clutch from said drum.

7. A spike machine comprising a supporting frame, a power shaft journaled in said frame, stock gripping, pointing and heading mechanism and means for actuating said mechanism supported in said frame, a reciprocating feed carriage, a laterally oscillating support for said carriage mounted in said frame and a cam mounted upon said shaft whereby oscillating motion is imparted to said carriage support.

8. In a spike machine, the combination of a frame, a stationary gripping die mounted on said frame and having a projection adapted to fit into depressions in the bar stock, said die being positioned in the interior of said frame, and laterally oscillating feeding mechanism mounted on the exterior of said frame and provided with a laterally movable gripping jaw, whereby the bar stock is permitted to pass said projection on said stationary die.

9. In a spike machine, the combination with a supporting frame and cam shafts, of feeding mechanism comprising a longitudinally reciprocating feed carriage, a laterally oscillating support for said carriage, an arm tiltably mounted on said carriage, a finger projecting from said arm adapted to be inserted in depressions in the bar stock, means for actuating said feeding mechanism, and a clutch to stop the feeding mechanism, of levers provided with opposing pointing and severing dies, top gripping means whereby a spike blank may be alternately grasped and released, laterally oscillatory side gripping means, resilient relief mechanism for said side gripping means, an oscillating heading lever connected by a pitman and crank to one of said cam shafts, kick out mechanism arranged to eject finished spikes from the machine and means for changing the stroke of the feeding mechanism, whereby the length of spikes may be varied without interrupting the operation of the machine.

10. In a spike machine, the combination, with a supporting frame and cam shafts, of feeding mechanism comprising a laterally oscillating carriage support, a longitudinally reciprocating feed carriage mounted upon said support and an arm tiltably mounted on said carriage containing a finger adapted to be inserted in depressions in the bar stock, means for actuating said feed mechanism, a clutch to stop the feed mechanism, of pointing levers provided with opposing pointing and severing dies, top gripping means whereby a spike blank may be alternately grasped and released, laterally oscillating side gripping means, pressure relief mechanism for said side gripping means, an oscillating heading lever connected by a pitman and crank to one of said cam shafts and kick out mechanism arranged to eject finished spikes from the machine.

11. In a spike machine, the combination of a supporting frame, stock feeding mechanism, stock straightening jaws, interlocking supports for said stock formed on said jaws and means for actuating said mechanism supported in said frame.

12. In a spike machine, the combination of a frame, a power shaft journaled in said frame, of feeding mechanism comprising a carriage, an arm tiltably mounted on said carriage, a finger projecting from said arm adapted to be inserted in depressions in the material to be operated upon, means for imparting reciprocating motion to said feeding mechanism and means for tilting said arm.

13. In a spike machine, the combination of a frame, a cam shaft journaled in said frame, a cam mounted on said shaft, feeding mechanism comprising a feed carriage and a support for said carriage tiltably mounted in said frame, linkage whereby said cam will impart oscillating motion to said support and straightening jaws mounted between said carriage support and said supporting frame, whereby the material to be operated upon will be guided into the machine and straightened.

14. In a spike machine, the combination of a frame, a power shaft journaled in said frame, of stock feeding mechanism, a drum revolubly mounted on said power shaft, a cam on said drum, linkage between said cam and said feed mechanism whereby motion is transmitted to said feeding mechanism from said drum, a clutch revoluble with said power shaft and slidable longitudinally thereon, a lug on said clutch, a recess in said drum, adapted to receive said lug, means for holding said lug in said recess, independently actuated means for withdrawing said lug from said recess and means for stopping the rotation of said drum.

15. A spike machine comprising a supporting frame, stock feeding mechanism, stock straightening jaws, interlocking supports for the stock formed on said jaws, gripping, pointing and ejecting mechanism mounted in said frame, shafts journaled in said frame, a series of cams mounted upon said shafts and adapted to severally impart motion to said mechanism and jaws and means for revolubly connecting said shafts.

16. A spike machine comprising a supporting frame, a power shaft journaled in said frame, gripping, pointing and heading mechanism, means for actuating said mechanism, said mechanism and means being supported in said frame, reciprocating feed mechanism, a cam revoluble with said power shaft, linkage between said cam and said feed mechanism, comprising a roller carriage, a lever tiltably mounted in said frame and rods connecting said roller carriage with said lever and said lever with said feed mechanism, and means for changing the point of connection between one of said rods and said lever to change the length of stroke of said feed mechanism.

17. A spike machine comprising a supporting frame, power shafts journaled in said frame, feeding, pointing, heading and ejecting mechanism suitably supported in said frame, a drum revolubly mounted on one of said power shafts, a cam on said drum, linkage between said cam and said feeding mechanism whereby motion is transmitted to said feeding mechanism from said drum and a clutch, revoluble with said power shaft and slidable longitudinally thereon, adapted to engage and disengage said drum.

18. In a spike machine, the combination with a supporting frame and cam shafts, of feeding mechanism comprising a feed carriage having a recess therein, arms tiltably mounted on said feed carriage, a finger projecting from one of said arms, adapted to be inserted in depressions in the bar stock, a block slidable in said recess, and a lug formed on said block and adapted to impart tilting motion to said arms.

19. In a spike machine, the combination of a frame formed with an unobstructed passageway for bar stock, feeding mechanism on the exterior of said frame, comprising a reciprocating feed carriage, a support for said feed carriage and an arm mounted on said feed carriage adapted to engage the material to be operated upon, said arm being offset from said passageway to permit unobstructed vision into the machine.

20. In a spike machine the combination of a frame having a longitudinal passageway therein, bell cranks journaled in said frame, pointing levers, provided with opposing dies, pivotally connected to said bell cranks, said pointing levers being offset from the center line of said passageway to permit an unobstructed view into the machine, and means for imparting tilting motion to said bell cranks.

21. In a spike machine, the combination of a frame, a stationary cam on said frame, a bell crank journaled in said frame, a pointing lever pivotally connected with said bell crank, a roller journaled in said pointing lever and adapted to travel on said cam surface and means for tilting said bell crank.

22. In a spike machine, the combination of a frame, of a gripping lever tiltably mounted in said frame, a cam surface integral with said gripping lever, a bell crank journaled in said frame, a pointing lever pivotally connected with said bell crank, a roller journaled in said lever, resilient means for holding said roller in contact with said cam surface and means for tilting said bell crank.

23. In a spike machine, the combination of a frame, bell cranks journaled in said frame, pointing levers provided with opposing dies pivotally connected to said bell cranks, a bell crank journaled in said frame at a distance from said first mentioned bell cranks, rods joining said last mentioned bell crank with said first mentioned bell cranks and means for imparting tilting motion to said last mentioned bell crank.

24. In a spike machine, the combination of a frame, a power shaft journaled in said frame, pointing levers provided with opposing pointing and severing dies, a cam mounted on said power shaft, a yoke pivotally mounted in said frame, said yoke being formed with arms straddling said cam, rollers mounted in said arm, adapted to bear upon the periphery of said cam whereby rotation of said cam will tilt said yoke, and means for transmitting motion from said yoke to said pointing levers.

25. In a spike machine, the combination of a frame, a power shaft and bell cranks journaled in said frame, pointing levers provided with opposing pointing and severing dies pivotally connected at their ends with said bell cranks, and means for imparting tilting motion to said bell cranks, comprising a cam mounted on said power shaft and linkage between said cam and said bell cranks.

26. A spike machine comprising a frame, a power shaft mounted in said frame, a top gripping lever pivoted in said frame, a die mounted in said lever, a pair of yokes arranged to straddle said power shaft and pivotally joined to said lever, a roller mounted between said yokes, a cam mounted on said power shaft and adapted to rotate between said yokes, a spring to hold said roller in contact with the periphery of said cam, feeding, pointing, heading and ejecting mechanism and means for actuating said mechanism, said mechanism and means being supported in said frame.

27. In a spike machine, the combination of a frame, a cam shaft journaled in said frame, a gripping lever pivoted in said frame, a gripping die mounted in said lever, a cam formed with two high segments separated by a lower segment mounted on said shaft and a yoke connected to said gripping lever and straddling said cam adapted to transmit tilting motion from said cam to said gripping lever.

28. In a spike machine, the combination of a frame, a stationary gripping die mounted in said frame, a face formed on said die with a projection to fit into depressions in bar stock, and laterally oscillating gripping mechanism, forming with said stationary die gripping jaws, whereby said bar stock will be alternately grasped and released.

29. In a spike machine, the combination of a frame, a cam shaft journaled in said frame, gripping mechanism tiltably mounted in said frame, relief arms pivoted at one end in said gripping mechanism and provided with a roller between their opposite ends, means for holding said roller in contact with the periphery of said cam, a stop to limit the movement of said relief arms and a spring mounted on said gripping mechanism adapted to normally hold said relief arm in contact with said stop but permitting said arms to tilt away from said stop under abnormal pressure.

30. In a spike machine, the combination of a frame, a cam shaft journaled in said frame, a cam mounted on said shaft, a side gripping device tiltably supported in said frame, a roller mounted on said gripping device, means for holding said roller in contact with the periphery of said cam and pressure relief mechanism mounted on said side gripping device.

31. In a spike machine, the combination of a frame, a cam shaft journaled in said frame, a side gripping lever tiltably supported in said frame, a cam mounted on said shaft adapted to impart oscillating motion to said gripping lever and a die, mounted in said lever, formed with a face having a projection adapted to fit into depressions in bar stock.

32. In a spike machine, the combination of a frame and a power shaft journaled in said frame, of heading mechanism comprising a heading lever pivoted directly, in said frame, a pitman pivotally connected at one end to said lever, and means, connected to the other end of said pitman and mounted on said power shaft, for imparting oscillating motion to said heading lever.

33. In a spike machine, the combination of a frame and a power shaft journaled in said frame, of a crank formed in said shaft, a tilting heading lever pivoted in said frame, a die mounted in said lever and a pitman pivotally connected directly to said heading lever at one end and revolubly connected to said crank at its other end.

34. In a spike machine, the combination of a frame, longitudinal and transverse power shafts journaled in said frame, a top gripping lever and a side gripping lever tiltably mounted in said frame, a cam mounted on said transverse power shaft adapted to actuate said top gripping lever, a cam mounted on said longitudinal power shaft adapted to actuate said side gripping lever and resilient relief mechanism mounted on said side gripping mechanism.

35. In a spike machine, the combination of a frame, longitudinal and transverse power shafts journaled in said frame, a top gripping lever and a side gripping lever tiltably mounted in said frame, a die rigidly held in said side gripping lever, a face formed on said die with a projection to fit into depressions in bar stock, a cam mounted on said transverse power shaft adapted to actuate said top gripping lever, and a cam mounted on said longitudinal power shaft adapted to actuate said side gripping lever.

36. In a spike machine, the combination of a frame, longitudinal and transverse power shafts journaled in said frame, a top gripping lever and a side gripping lever tiltably mounted in said frame, a cam mounted on said transverse power shaft, a yoke pivotally joined to said top gripping lever, provided with a roller and resilient means for holding said roller in contact with the periphery of said cam, and a cam mounted on said longitudinal power shaft adapted to actuate said side gripping lever.

37. In a spike machine, the combination of a frame, longitudinal and transverse power shafts journaled in said frame, a top gripping lever and a side gripping lever tiltably mounted in said frame, a pair of yokes arranged to straddle said transverse power shaft and pivotally joined to said top gripping lever, a roller mounted between said yokes, a cam mounted on said transverse power shaft and adapted to rotate between said yokes, a spring to hold said roller in contact with the periphery of said cam and a cam mounted on said longitudinal power shaft adapted to actuate said side gripping lever.

38. In a spike machine, the combination of a frame, longitudinal and transverse power shafts journaled in said frame, a top gripping lever and a side gripping lever tiltably mounted in said frame, a cam mounted on said transverse power shaft adapted to actuate said top gripping lever, a cam mounted on said longitudinal power shaft adapted to actuate said side gripping lever, relief arms pivoted at one end in said side gripping lever and provided with a roller between their opposite ends, resilient means for holding said roller in contact with the periphery of said cam, a stop to limit the movement of said relief arms and a spring mounted on said side gripping lever adapted to normally hold said relief arms in contact with said stop but permitting said arms to tilt away from said stop under abnormal pressure.

39. In a spike machine, the combination of a frame, laterally and vertically oscillating gripping devices supported in said frame, power shafts journaled in said frame, and cams mounted on said power shafts, whereby motion is imparted to said gripping devices.

40. In a spike machine, the combination of a frame, longitudinal transverse power shafts journaled in said frame, a top gripping lever and a side gripping lever tiltably mounted in said frame, a cam, mounted on said transverse power shaft, adapted to actuate said top gripping lever and a cam mounted on said longitudinal power shaft adapted to actuate said side gripping lever.

41. In a spike machine, the combination of a supporting frame, feeding mechanism, comprising a feed carriage, a support for said carriage mounted in said frame and straightening jaws, mounted between said support and said frame adapted to straighten the bar stock and guide it into the machine, gripping, pointing and ejecting mechanism supported in said frame, longitudinal and transverse shafts journaled in said frame and a plurality of cams mounted on said shafts adapted severally to impart motion to said mechanism.

In testimony whereof, I have hereunto signed my name to this specification.

GOTTLIEB WEBER.